United States Patent [19]

Young

[11] Patent Number: 5,594,055
[45] Date of Patent: Jan. 14, 1997

[54] ANTIOXIDANT SYSTEM FOR POLYOLEFINS

[75] Inventor: Sai-Shek Young, Spring Valley, N.Y.

[73] Assignee: Hoffmann-La Roche Inc., Nutley, N.J.

[21] Appl. No.: 392,454

[22] Filed: Feb. 22, 1995

[51] Int. Cl.$^6$ ............................ C08K 5/05; C08K 5/10; C08K 5/15

[52] U.S. Cl. ............ 524/291; 524/110; 524/317; 524/386; 524/389; 252/404; 252/407

[58] Field of Search ..................... 252/404, 407; 524/291, 110, 317, 386, 389

[56] References Cited

U.S. PATENT DOCUMENTS

| | | | |
|---|---|---|---|
| 4,532,165 | 7/1985 | Hashimoto et al. | 428/36 |
| 4,680,327 | 7/1987 | Hettche et al. | 524/110 |
| 5,308,549 | 5/1994 | Laermer et al. | 252/399 |

FOREIGN PATENT DOCUMENTS

| | | |
|---|---|---|
| 191463 | 8/1986 | European Pat. Off. . |
| 542108 | 5/1993 | European Pat. Off. . |
| 90/07547 | 7/1990 | WIPO . |
| 93/10175 | 5/1993 | WIPO . |

OTHER PUBLICATIONS

Academic Press Dictionary of Science and Technology, Edited by Christopher Morris, Academic Press, pp. 939 and 2142 (1992).

*Primary Examiner*—Kriellion S. Morgan
*Attorney, Agent, or Firm*—George W. Johnston; Dennis P. Tramaloni; Alan P. Kass

[57] ABSTRACT

A phosph(on)ite free antioxidant system based on an α-tocopherol formulation and a compound selected from tetrakis [methylene(3,5-di-tert.-4-hydroxyhydrocinnamate]methane or octadecyl 3,5-di-tert.-4-hydroxyhydrocinnamate is disclosed. This system can replace phenolic/phosphite combinations as the primary system, or simply replace the phosphite portion, to achieve certain optimum performance requirements. In either case, the problems associated with phosph(on)ites can be eliminated or minimized.

24 Claims, No Drawings

ANTIOXIDANT SYSTEM FOR POLYOLEFINS

BACKGROUND OF THE INVENTION

Phosphites and phosphonites have been well regarded for years as efficient hydroperoxide decomposers, often giving synergistic effects in combination with the more efficient peroxy radical scavenging phenolic antioxidants. However some of the commonly used phosphites are hydrolyrically unstable, can contribute to corrosion and handling problems during transfer and mixing, and occasionally form "black specks" during extrusion at higher temperatures and longer residence times. Further, some show an adverse effect on organoleptic properties, which can limit their use in materials for packaging applications. Despite much continued work toward new phosphites and phosphonites with incrementally better properties, there has been a need for a phosph(on)ite-free phenolic antioxidant system for plastic materials.

Aside from its inherent safety (it is edible & GRAS) and its suitable physical properties, α-tocopherol, also known as vitamin E, is an effective scavenger of oxy radicals, such as hydroperoxyl, alkoxyl, hydroxyl, phenoxyl, etc. known. It is also a very reactive towards less electrophilic radicals such as alkyl, towards hydroperoxides, excited states of ketones, singlet oxygen, ozone, superoxide, nitrogen oxides, and other reactive species associated with oxidative damage. In many cases the relative reactivity of tocopherol has been found to be orders of magnitude faster than those of other phenolics. Its transformation products include materials which are also effective oxy radical and carbon radical scavengers.

Like most phenolics, α-tocopherol forms some colored transformation products. Some earlier attempts at its use for polyolefin stabilization have failed because investigators did not appreciate the opportunity to use the much lower amounts of tocopherol which its unusual reactivity affords. In many cases appropriately lower levels of tocopherol now give very good stabilization with acceptable color results, notably in polyethylenes. To improve results in more demanding applications, a formulation of α-tocopherol with glycerol and glycerol surfactants was developed.

Secondary antioxidants such as phosphites and phosphonites have played a very important role in the stabilization of polyolefins for years. As peroxide decomposers, they must compete effectively with the polymer substrate RH for the chain-propagating alkyl peroxy radicals (ROO•) and they must also form an efficient chain-terminating agent in this reaction with the ROO• radicals. The antioxidative efficiency of the phosphites are greatly affected by the polar and steric effects of the groups bound to phosphorus, decreasing with increasing electron-acceptor ability, and by the bulkiness of the substituent groups. They also must be hydrolytically stable to be blended and mixed thoroughly and homogeneously with the primary phenolic antioxidants. The hydrolytic stability of phosphites improves as the number of phosphorus-carbon bonds increase. Unfortunately, the most effective phosphites in the market today are not very hydrolytically stable and can cause mixing/handling problems to the polymer producers, as well as convertors and compounders. The commonly used phosphites occasionally form 'black specks' during extrusion at high temperature and for long residence time. Besides hydrolytic instability problems, phosphites also show an adverse effect on the organoleptic properties, which can limit their use in the packaging industry. Therefore, there is a strong desire and interest to develop a phosph(on)ite free phenolic antioxidant system. It is also an object to provide a polyolefin composition that is stabilized with a phosph(on)ite free antioxidant system.

SUMMARY OF THE INVENTION

A phosphite/phosphonite free stabilizing mixture for plastic materials is presented which consists of components (a) α-tocopherol solution (α-tocopherol in glycerin, glyceride surfactant and PEG) and (b) a compound selected from (i) tetrakis[methylene-(3,5-di-tert.-butyl-4-hydroxyhydrocinnamate]methane or (ii) octadecyl 3,5-di-tert.-butyl-4-hydroxyhydrocinnamate. Preferably, the stabilizing mixture consists essentially of components (a) and (b) in a ratio of from about 2:1 to about 6:1, with a ratio of from about 2:1 to about 3:1 being most preferred.

The amount of the stabilizing mixture for the plastic material ranges from about 0.01% to about 0.5%, preferably from about 0.03% to about 0.1%, by weight, in relation to the weight of the plastic material being stabilized.

DETAILED DESCRIPTION OF THE INVENTION

As used herein, plastic material refers to, among others, polyolefins including, but not limited to (1) polyethylene, including, but not limited to, high density polyethylene, low density polyethylene, linear low density polyethylene, and ultra high molecular weight polyethylene, which contain as one of the repeating units in a copolymer the polyethylene monomer moiety, or blends of polyethylene and one or more other polymers. Those skilled in the art will appreciate and will know how to make the different types of copolymers that can be formed with polyethylene, including alternating, block and graft copolymers as well as how to make the blends of polyethylene with other polymers; and (2) polypropylene, including homopolymers, copolymers which contain as one of the repeating units in a copolymer the polypropylene monomer moiety, or blends of polypropylene and one or more other polymers. Those skilled in the art will appreciate and will know how to make the different types of copolymers that can be formed with polypropylene, including alternating, block and graft copolymers as well as how to make the blends of polypropylene with other polymers. Plastic materials also include polyvinyl chlorides, styrene polymers, including copolymers thereof, and polyurethanes.

The stabilizing mixtures of the present invention may be produced by simple physical mixing of the components (a) and (b) with each other in the desired ratio. Preferably, an intimate, homogeneous mixture of the two components is achieved. The methods of admixture and the equipment used for this purpose are well known in the art. The physical mixing process represents a further aspect of the present invention. Additionally, components (a) and (b) can be separately added to plastic material so as to achieve the desired ratio.

The stabilizing mixture of the present invention featuring the ratio of (a):(b) of from about 2:1 to about 6:1 by weight produce improved processing stability and color stability, while maintaining the heat aging stability, for the plastic materials, for example, polyethylene and polypropylene, incorporating such mixtures.

The methods of incorporating the stabilizing mixtures of the present invention into the plastic material to be stabilized may be effected by the conventional methods which are generally used for the stabilization of plastic materials by additives. These method are well known in the art and may involve the incorporation of the stabilizing mixture as such or of the components (a) and (b) individually, in the correct ratio, at any convenient stage of making or processing of the plastic material.

In each case, the stabilizing mixture according to the present invention is generally incorporated in a concentration of from about 0.01 to about 0.5%, preferably from about 0.03 to about 0.1%, by weight in relation to the weight of the plastic material to be stabilized.

In general, the stabilizing formulations are particularly effective in stabilizing the plastic material in which they are incorporated against undesired discoloration.

Seven polymers, two high density polyethylene (HDPE) (based on Phillips and Ziegler type catalysts system) and five polypropylenes (PP) manufactured by different processes or catalyst systems: PP-1 (Spheripol—SHAC), PP-2 (GF-2A catalyst—bulk loop), PP-3 (Modified Phillips bulk loop), PP-4 (Gas-phase, Unipol), and PP-5 (Gas-phase, Mitsui-Himont Process) were studied with mixtures of the present invention.

Additional tests such as oven-aging at 120° C. and 150° C. and film extrusion to quantify the effect of additives on gel formation were conducted with selected polymers.

All polymer substrates were subjected to multiple extrusions of five passes at 260° C. (500° F.) through a 35 mm (1⅜ in. D) conical co-rotating twin-screw extruder. The change in color (YI) and melt flow rates (MFR) were measured according to ASTM D-1925 and ASTM D-1238. PP-3 was also extruded into films and examined by a laser scanner (Film Quality Analyzer, FQA, manufactured by Brabender Instruments, Hackensack, N.J.) to compare the effect of different antioxidant (AO) packages on gel formation during film extrusion. In all cases, a combination of a phenolic AO and a phosphite was used as a standard for comparison. The antioxidants used in this study were: Tetrakis[methylene(3,5-di-tert.-butyl-4-hydroxy-hydrocinnamate]-methane (abbreviated as AO-1010); octadecyl 3,5-di-tert.-butyl-4-hydroxyhydrocinnamate (abbreviated as AO-1076); α-tocopherol (abbreviated as R-201); α-tocopherol formulation based on glycerin, glyceride surfactant, and PEG (polyethylene glycol) (abbreviated as CF-120); Tris [2,4-di-tert-butylphenyl]phosphite (abbreviated as P-168); and Bis[2,4-di-t-butyl]pentaerythritol diphosphite (abbreviated as P-626). CF-120 is also more fully disclosed in U.S. Pat. No. 5,308,549, which is incorporated by reference herein.

(A) HDPE-1 (Phillips Cr Catalyst)

Table I shows the performance of two commonly used phenolic and phenolic/phosphite standards of AO-1010 alone at 500 ppm and AO-1010/P-168 combination at 400 ppm each, compared to the 'phosphite-free' systems of CF-120 alone at 400 ppm and the combination of AO-1010 and CF-120 at the very low level of 100 ppm and 200 ppm respectively. While all AO systems provided similar melt flow protection during processing, excellent color was provided by CF-120. When replacing P-168 with CF-120 in the phenolic/phosphite combination, tremendous color improvement was also observed.

(B) HDPE-2 (Ziegler Catalyst)

This blow-molding resin underwent the same test treatment as HDPE-1 and similar good results were observed. The improvement in color offered by CF-120 was once again demonstrated in Table I. To eliminate the handling, mixing (i.e., hydrolytic instability) and processing problems (i.e., black specks) that are associated with common phosphites in the phenolic/phosphite systems, CF-120 can be used to replace P-168. It worked extremely well with AO-1010, reducing the color to that of the original blank resin and maintaining the same melt flow stability provided by AO-1010 alone or AO-1010/P-168 combination.

TABLE 1

Performance of 'Phosphite - Free' System in HDPE-1 and HDPE-2
HDPE 100%
Ca Stearate 0.00%

| | Additives | Conc. % | YI 1 | YI 3 | YI 5 | MFR 1 | MFR 3 | MFR 5 |
|---|---|---|---|---|---|---|---|---|
| (A) HDPE - 1 (Phillips-Cr) | | | | | | | | |
| 1 | Blank | | −1.3 | 1.1 | 2.4 | 0.38 | 0.32 | 0.25 |
| 2 | AO-1010 | 0.05 | 3.2 | 4.8 | 6.4 | 0.65 | 0.60 | 0.53 |
| 3 | AO-1010 P-168 | 0.04 0.04 | 2.3 | 3.8 | 4.9 | 0.65 | 0.60 | 0.59 |
| 4 | CF-120 | 0.04 | −1.1 | 0.2 | 1.4 | 0.63 | 0.60 | 0.58 |
| 5 | AO-1010 CF-120 | 0.01 0.02 | −1.1 | 0.7 | 1.7 | 0.65 | 0.62 | 0.52 |
| (B) HDPE - 2 (ZIEGLER) | | | | | | | | |
| 1 | Blank | | −1.4 | 0.2 | 0.8 | 0.59 | 0.50 | 0.43 |
| 2 | AO-1010 | 0.05 | 3.1 | 4.9 | 6.5 | 0.83 | 0.87 | 0.88 |
| 3 | AO-1010 P-168 | 0.05 0.05 | 3.2 | 3.8 | 4.7 | 0.86 | 0.90 | 0.92 |
| 4 | CF-120 | 0.04 | 1.2 | −0.3 | 0.6 | 0.84 | 0.86 | 0.90 |
| 5 | AO-1010 CF-120 | 0.01 0.02 | −1.2 | 0.1 | 1.3 | 0.83 | 0.87 | 0.87 |

YI measured per ASTM D-1925, 2 deg./Ill. C.
MFR measured per ASTM D-1238, 190° C./2.16 kg., g/10 min.
Extrusion at 260° C. (500° F.).

(C) PP-1 to PP-5

Five PP resins representing the current polymerization technology were examined. In Tables II, III and IIIA, the 'phosphite-free' systems of CF-120 alone and in combination with AO-1010 or AO-1076 were evaluated against the current state of the art phenolic/phosphite system. Essentially, these 'phosphite-free' systems, especially the CF-120/AO-1010 and CF-120/AO-1076 combinations offered better or equivalent color and melt flow performance and with the benefit of not having to deal with the problems associated with phosphites.

TABLE II

Performance of 'Phosphite - Free' Systems in PP-1, PP-2 and PP-3
PP 100%
Ca Stearate 0.05%

| | Additives | Conc. % | YI 1 | YI 3 | YI 5 | MFR 1 | MFR 3 | MFR 5 |
|---|---|---|---|---|---|---|---|---|
| PP-1 (Spheripol-SHAC) | | | | | | | | |
| 1 | Blank | | 2.5 | 3.9 | 4.1 | 10.8 | 12.0 | 15.5 |
| 2 | AO-1010 | 0.075 | 3.6 | 5.2 | 6.4 | 4.0 | 4.2 | 4.4 |
| 3 | P-168 | 0.075 | | | | | | |
| 4 | AO-1010 P-168 | 0.05 0.1 | 4.6 | 5.5 | 6.5 | 3.8 | 4.2 | 4.2 |
| 5 | CF-120 | 0.125 | 4.4 | 6.1 | 7.0 | 4.0 | 4.0 | 5.1 |
| | AO-1010 CF-120 | 0.025 0.05 | 3.7 | 4.9 | 6.0 | 5.1 | 4.9 | 5.8 |
| PP-2 (Bulk loop - GF-2A Catalyst) | | | | | | | | |
| 1 | Blank | | 6.4 | 8.8 | 9.3 | 9.1 | 12.6 | 17.2 |

TABLE II-continued

Performance of 'Phosphite - Free' Systems
in PP-1, PP-2 and PP-3
PP 100%
Ca Stearate 0.05%

| | Additives | Conc. % | YI 1 | YI 3 | YI 5 | MFR 1 | MFR 3 | MFR 5 |
|---|---|---|---|---|---|---|---|---|
| 2 | AO-1010 | 0.075 | 7.7 | 14.6 | 17.3 | 5.6 | 5.5 | 6.0 |
|   | P-168 | 0.075 | | | | | | |
| 3 | AO-1010 | 0.05 | 8.6 | 12.1 | 13.5 | 4.8 | 4.6 | 4.9 |
|   | P-168 | 0.1 | | | | | | |
| 4 | CF-120 | 0.125 | 8.7 | 12.0 | 15.1 | 5.1 | 5.5 | 5.5 |
| 5 | AO-1010 | 0.025 | 5.2 | 7.8 | 10.0 | 4.9 | 5.4 | 6.2 |
|   | CF-120 | 0.05 | | | | | | |
| | PP-3 (Modified Phillips bulK loop) | | | | | | | |
| 1 | Blank | | 1.9 | 2.7 | 3.3 | 11.9 | 12.0 | 12.1 |
| 2 | AO-1010 | 0.075 | 3.0 | 6.1 | 7.8 | 4.0 | 3.9 | 3.9 |
|   | P-168 | 0.075 | | | | | | |
| 3 | AO-1010 | 0.05 | 3.2 | 5.7 | 6.9 | 4.0 | 4.1 | 4.4 |
|   | P-168 | 0.1 | | | | | | |
| 4 | CF-120 | 0.125 | 3.8 | 4.9 | 6.2 | 4.5 | 4.2 | 4.2 |
| 5 | AO-1010 | 0.025 | 3.4 | 4.7 | 3.5 | 4.9 | 4.7 | 4.4 |
|   | CF-120 | 0.05 | | | | | | |

YI measured per ASTM D-1925, 2 deg./lll. C.
MFR measured per ASTM D-1238, 190° C./2.16 kg., g/10 min.
Extrusion at 260° C. (500° F.).

TABLE III

Performance of Stability of PP-4
(Gas-Phase Unipol Process)
PP 100%
Ca Stearate 0.05%

| | Additives | Conc. % | YI 1 | YI 3 | YI 5 | MFR 1 | MFR 3 | MFR 5 |
|---|---|---|---|---|---|---|---|---|
| 1. | AO-1010 | 0.05 | 5.0 | 8.3 | 10.4 | 5.1 | 6.0 | 9.5 |
|    | P-168 | 0.05 | | | | | | |
| 2. | AO-1010 | 0.075 | 4.4 | 6.5 | 8.3 | 5.0 | 5.6 | 6.2 |
|    | P-168 | 0.075 | | | | | | |
| 3. | R-201 | 0.02 | 4.5 | 6.3 | 6.8 | 3.9 | 4.0 | 4.0 |
|    | P-626 | 0.04 | | | | | | |
| 4. | R-201 | 0.02 | 4.4 | 5.9 | 7.0 | 3.9 | 4.1 | 4.1 |
|    | P-626 | 0.08 | | | | | | |
| 5. | CF-120 | 0.1 | 5.5 | 8.7 | 11.2 | 4.3 | 5.3 | 6.0 |
| 6. | CF-120 | 0.125 | 6.2 | 8.8 | 11.5 | 4.8 | 5.5 | 6.1 |
| 7. | CF-120 | 0.05 | 4.1 | 5.7 | 7.2 | 4.6 | 5.4 | 6.4 |
|    | AO-1010 | 0.025 | | | | | | |
| 8. | CF-120 | 0.075 | 4.8 | 6.5 | 8.3 | 4.7 | 5.4 | 5.6 |
|    | AO-1010 | 0.025 | | | | | | |

Y1 per ASTM D-1925, 2 deg./lll. C.
MFR per ASTM D-1238, 230° C./2.16 kg.

TABLE IIIA

Performance of Stability of PP-5
(Gas-Phase Mitsui-Himont Process)
PP 100%
Ca Stearate 0.05%

| | Additives | Conc. % | YI 1 | YI 3 | YI 5 | MFR 1 | MFR 3 | MFR 5 |
|---|---|---|---|---|---|---|---|---|
| 1. | Blank | | 2.7 | 3.5 | 4.0 | 6.6 | 11.5 | 22.6 |
| 2. | AO-1076 | 0.1 | 3.7 | 4.6 | 6.5 | 2.5 | 2.8 | 3.9 |
|    | P-626 | 0.05 | | | | | | |
| 3. | AO-1076 | 0.1 | 4.5 | 6.7 | 8.4 | 2.8 | 3.8 | 5.6 |
|    | P-168 | 0.05 | | | | | | |

TABLE IIIA-continued

Performance of Stability of PP-5
(Gas-Phase Mitsui-Himont Process)
PP 100%
Ca Stearate 0.05%

| | Additives | Conc. % | YI 1 | YI 3 | YI 5 | MFR 1 | MFR 3 | MFR 5 |
|---|---|---|---|---|---|---|---|---|
| 4. | CF-120 | 0.1 | 5.3 | 7.1 | 8.7 | 2.5 | 3.0 | 3.5 |
| 5. | CF-120 | 0.125 | 4.9 | 6.7 | 8.2 | 2.3 | 2.8 | 3.3 |
| 6. | AO-1076 | 0.25 | 3.7 | 5.5 | 6.7 | 2.6 | 3.5 | 4.3 |
|    | CF-120 | 0.50 | | | | | | |
| 7. | AO-1076 | 0.025 | 4.0 | 6.0 | 6.9 | 2.6 | 2.9 | 3.3 |
|    | CF-120 | 0.075 | | | | | | |
| 8. | AO-1076 | 0.05 | 4.0 | 6.0 | 7.0 | 2.5 | 3.1 | 3.3 |
|    | CF-120 | 0.05 | | | | | | |

Y1 per ASTM D-1295, 2 deg./lll. C.
MFR per ASTM D-1238, 230° C./2.16 kg.

Some formulations of PP-4 (Gas-phase Unipol) were further exposed to oven-aging at 120° C. and 150° C. (Table IV). At the harsh condition of 150° C., all samples failed in five days while at 120° C., a better predictive value for normal usage, the AO-1010/P-168, AO-1010/CF-120 samples extended their service life to over 63 days (test terminated at 63 days).

TABLE IV

Oven-aging of PP-4 at 120°C.
PP 100% (Gas Phase, Unipol)
Ca Stearate 0.05%

| | Additives | Conc. % | YI 1 | YI 3 | YI 5 | MFR 1 | MFR 3 | Oven-aging @ 120° C., Days to Failure |
|---|---|---|---|---|---|---|---|---|
| 1. | Blank w/o Ca St. | | 9.6 | 11.3 | 12.1 | 5.8 | 8.7 | 13.3 3** |
| 2. | AO-1010 | 0.075 | 4.4 | 6.5 | 8.3 | 5.0 | 5.6 | 6.2 21*/>63 |
|    | P-168 | 0.075 | | | | | | |
| 3. | R-201 | 0.02 | 4.5 | 6.3 | 6.8 | 3.9 | 4.0 | 4.0 28** |
|    | P-626 | 0.04 | | | | | | |
| 4. | CF-120 | 0.01 | 5.5 | 8.7 | 11.2 | 4.3 | 5.3 | 6.0 15** |
| 5. | CF-120 | 0.05 | 4.1 | 5.7 | 7.2 | 4.6 | 5.4 | 6.4 28*/>63 |
|    | AO-1010 | 0.025 | | | | | | |
| 6. | CF-120 | 0.075 | 4.8 | 6.5 | 8.3 | 4.7 | 5.4 | 5.6 >63 |
|    | AO-1010 | 0.025 | | | | | | |

Note:
*first sign of degradation, yellow spots along the edge(s).
**total degradation, crumbs falling from the plaques. Oven-aging done at 120° C./2.16 kg.
Y1 per ASTM D-1925, 2 deg./lll. C.
MFR per ASTM D-1238, 230° C./2.16 kg.

Gel Reduction in HDPE & PP Film Extrusion (A) HDPE

Table V shows the improvement in gel reduction in processing a HDPE resin into film under two temperatures of 191° C. (375° F.) and 246° C. (475° C.). Both R-201 and CF-120 showed an improvement over AO-1010. This experiment was conducted by visually examining a 76 mm×304 mm×0.076 mm (3"W×12"L×0.003"T) film.

TABLE V

Gel Reduction in HDPE (1st & 8th Pass) Processed at 190° C. & 246° C. (375 & 475° F.)

No. of Gels per Sq. In., Visual Obs. on 2.62 Sq. M. (36 sq. in.) film

| | | 190° C. | | | 246° C. | | |
|---|---|---|---|---|---|---|---|
| Additives | Conc. % | 1st | 4th | 8th | 1st | 4th | 8th |
| 1  AO-1010 | 0.04 | 0.58 | 13.3 | 8.61 | 0.56 | 10.8 | 13.3 |
| 2  R-201 | 0.01 | 0.50 | 0.61 | 1.53 | 0.50 | 0.75 | 1.39 |
| 3  CF-120 | 0.1 | 0.89 | 1.25 | 1.14 | 0.97 | 1.47 | 2.42 |

Single Screw Brabender Extruder: D=19 mm (¾ in), L/D= 20:1

(B) PP-3 (Modified Phillips Bulk Loop Process)

A gel analysis experiment was conducted with PP-3 using a computerized Film Quality Analyzer (FQA). Five formulations were examined (the blank resin without any additive, AO-1010/P-168 at 500/1000 ppm, R-201/P-626 at 200/400 ppm and CF-120 at 1250 ppm alone without any phosphite and the combination of AO-1010/CF-120 at 250/500 ppm each). All formulations contained 500 ppm of calcium stearate. The experiment was conducted at a melt temperature of 220° C. (428° F.). The FQA picked up the extruded PP film (i.e., 10.16 cm or 4 in. dia.) between a set of rollers under a well-illuminated 50 mm video camera window. The FQA separated the gels into different classes depending on the size, counted the number of gels in each class, and then normalized the number of gels, using its built-in calibration, over an area of one square meter. Therefore, the resulting data were segregated as "number of particles per square meter" for six different classes of gel sizes. Film imperfections or gels in class 3 and 4 (i.e., 52 μm to 250 μm) are most visible to human eyes (Table VI).

TABLE VI

Effect of AO Systems on Gel Formation During Extrusion (PP-3)

No. of Gels per Sq. Meter (by Class & Upper Limit Size)

| Additives | Conc. % | Class 2[1] 52 μm | Class 3[1] 100 μm | Class 4[1] 250 μm | Class 5 500 μm | Class 6 1000 μm |
|---|---|---|---|---|---|---|
| 1. Blank | — | 409 | 476 | 401 | 51 | 4 |
| 2. AO-1010 P-168 | 0.05 0.1 | 260 | 257 | 247 | 47 | 0 |
| 3. AO-201 P-626 | 0.02 0.04 | 72 | 130 | 119 | 4 | 0 |
| 4. AO-120 | 0.125 | 64 | 111 | 72 | 0 | 0 |
| 5. AO-1010 CF-120 | 0.025 0.05 | 127 | 160 | 143 | 4 | 0 |

[1] Most important classes of gel size 4 inches wide film extruded at 220° C. and analyzed by Film Quality Analyzer.

The data show that the 'phosphite free' system of CF-120 alone and the AO-1010/CF-120 combination provided excellent gel reduction.

I claim:

1. A stabilizing mixture for plastic materials comprising:
   (a) a α-tocopherol solution comprising: α-tocopherol, glycerin, glyceryl monocaprylate-caprate, and PEG; and
   (b) a compound selected from (i) tetrakis[methylene(3,5-di-tert.-butyl-4-hydroxyhydrocinnamate]methane or (ii) octadecyl 3,5-di-tert.-butyl-4-hydroxyhydrocinnamate.

2. The stabilizing mixture of claim 1 wherein the ratio of (a):(b) is from about 2:1 to about 6:1.

3. The stabilizing mixture of claim 2 wherein the ratio of (a):(b) is from about 2:1 to about 3:1.

4. The stabilizing mixture of claim 2 wherein the compound of (b) is tetrakis[methylene(3,5-di-tert.-butyl-4-hydroxyhydro cinnamate]methane.

5. The stabilizing mixture of claim 2 wherein the compound of (b) is octadecyl 3,5-di-tert.-butyl-4-hydroxyhydrocinnamate.

6. A stabilizing mixture for plastic materials consisting essentially of:
   (a) a α-tocopherol solution comprising: α-tocopherol, glycerin, glyceryl monocaprylate-caprate, and PEG; and
   (b) a compound selected from (i) tetrakis[methylene(3,5-di-tert.-butyl-4-hydroxyhydrocinnamate]methane or (ii) octadecyl 3,5-di-tert.-butyl-4-hydroxyhydrocinnamate.

7. The stabilizing mixture of claim 6 wherein the ratio of (a):(b) is from about 2:1 to about 6:1.

8. The stabilizing mixture of claim 7 wherein the ratio of (a):(b) is from about 2:1 to about 3:1.

9. The stabilizing mixture of claim 7 wherein the compound of (b) is tetrakis[methylene(3,5-di-tert.-butyl-4-hydroxyhydro cinnamate]methane.

10. The stabilizing mixture of claim 7, wherein the compound of (b) is octadecyl 3,5-di-tert.-butyl-4-hydroxyhydrocinnamate.

11. A polymer composition comprising:
   100 parts by weight of a polymer selected from the group consisting of polyethylene and polypropylene;
   about 0.01 to about 0.075 parts by weight of a composition comprising about 20 percent by weight alpha-tocopherol, about 20 percent by weight glycerin, about 17 percent by weight PEG-300, and about 43 percent by weight glyceryl monocaprylate-caprate; and
   about 0.025 parts by weight of a compound selected from tetrakis[methylene(3,5-di-tert.-butyl-4-hydroxyhydrocinnamate)]-methane or octadecyl 3,5-di-tert.-butyl-4-hydroxyhydrocinnamate.

12. The composition of claim 11 wherein the polymer is polyethylene.

13. The composition of claim 12 wherein the compound of (b) is tetrakis [methylene(3,5-di-tert.-butyl-4-hydroxyhydrocinnamate)]methane.

14. The composition of claim 12 wherein the compound of (b) is octadecyl 3,5-di-tert.-butyl-4-hydroxyhydrocinnamate.

15. The composition of claim 11 wherein the polymer is polypropylene.

16. The composition of claim 15 wherein the compound of (b) is tetrakis[methylene(3,5-di-tert.-butyl-4-hydroxyhydrocinnamate)]methane.

17. The composition of claim 15, wherein the compound of (b) is octadecyl 3,5-di-tert.-butyl-4-hydroxyhydrocinnamate.

18. A polymer composition consisting essentially of:
100 parts by weight of a polymer selected from the group consisting of polyethylene and polypropylene;
about 0.01 to about 0.075 parts by weight of a composition comprising about 20 percent by weight alpha-tocopherol, about 20 percent by weight glycerin, about 17 percent by weight PEG-300, and about 43 percent by weight glyceryl monocaprylate-caprate; and
about 0.025 parts by weight of a compound selected from tetrakis[methylene(3,5-di-tert.-butyl-4-hydroxyhydrocinnamate)]-methane or octadecyl 3,5-di-tert.-butyl-4-hydroxyhydrocinnamate.

19. The composition of claim 18 wherein the polymer is polyethylene.

20. The composition of claim 19 wherein the compound of (b) is tetrakis[methylene(3,5-di-tert.-butyl-4-hydroxyhydrocinnamate)]methane.

21. The composition of claim 19 wherein the compound of (b) is octadecyl 3,5-di-tert.-butyl-4-hydroxyhydrocinnamate.

22. The composition of claim 18 wherein the polymer is polypropylene.

23. The composition of claim 22 wherein the compound of (b) is tetrakis[methylene (3,5-di-tert.-butyl-4-hydroxyhydrocinnamate)]methane.

24. The composition of claim 22 wherein the compound of (b) is octadecyl 3,5-di-tert.-butyl-4-hydroxyhydrocinnamate.

* * * * *